US012126088B2

(12) United States Patent
Chou et al.

(10) Patent No.: US 12,126,088 B2
(45) Date of Patent: Oct. 22, 2024

(54) DUAL-POLARIZED ANTENNA AND RELATED ANTENNA MODULE AND ELECTRONIC DEVICE

(71) Applicant: CYNTEC CO., LTD., Hsinchu (TW)

(72) Inventors: Sheng-Ju Chou, Hsinchu (TW); Ping-Chang Huang, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 140 days.

(21) Appl. No.: 17/967,873

(22) Filed: Oct. 17, 2022

(65) Prior Publication Data

US 2023/0117822 A1 Apr. 20, 2023

Related U.S. Application Data

(60) Provisional application No. 63/257,087, filed on Oct. 18, 2021.

(51) Int. Cl.
*H01Q 21/26* (2006.01)
*H01Q 19/02* (2006.01)

(52) U.S. Cl.
CPC ........... *H01Q 21/26* (2013.01); *H01Q 19/025* (2013.01)

(58) Field of Classification Search
CPC ........ H01Q 1/243; H01Q 9/065; H01Q 21/24; H01Q 21/062; H01Q 19/106; H01Q 5/385; H01Q 21/26; H01Q 19/025
See application file for complete search history.

(56) References Cited

U.S. PATENT DOCUMENTS

| | | | |
|---|---|---|---|
| 2012/0146869 A1 | 6/2012 | Holland | |
| 2016/0104934 A1 | 4/2016 | Jang | |

FOREIGN PATENT DOCUMENTS

| | | | | |
|---|---|---|---|---|
| CN | 110649366 A | | 1/2020 | |
| CN | 112563741 A | | 3/2021 | |
| CN | 112787089 A | * | 5/2021 | ............... H01Q 1/38 |
| WO | 2020/153098 A1 | | 7/2020 | |

OTHER PUBLICATIONS

Zhi-Feng Yuan, Zhi-Hong Tu, Wideband+45° Dual-Polarized Millimeter-Wave Antenna Array with Wide-Angle Scanning Performance, 2021 International Conference on Microwave and Millimeter Wave Technology (ICMMT), 2021 IEEE, p. 1-3, XP034034410, China, 2021.

* cited by examiner

*Primary Examiner* — Henry Luong
(74) *Attorney, Agent, or Firm* — Winston Hsu

(57) ABSTRACT

An antenna includes a ground layer, two polarization signal feeding terminals disposed on the ground layer, two polarization structures, four coupling metals and four radiating metals. The first polarization structure includes a first extending portion electrically connected to the first polarization signal feeding terminal and extends from a first channel to a second channel in a first direction over the ground layer. The second polarization structure includes a second extending portion electrically connected to the second polarization signal feeding terminal and extends from a third channel to a fourth channel in second direction over the ground layer, wherein the first extending portion crosses the second extending portion in a non-contact manner to define four regions. The four coupling metals are disposed on the first through the fourth regions, respectively. The four radiating metals are disposed on the first through the fourth channels, respectively.

23 Claims, 15 Drawing Sheets

DUAL-POLARIZED ANTENNA AND RELATED ANTENNA MODULE AND ELECTRONIC DEVICE

CROSS REFERENCE TO RELATED APPLICATIONS

This application claims the benefit of U.S. Provisional Application No. 63/257,087, filed on Oct. 18, 2021. The content of the application is incorporated herein by reference.

BACKGROUND OF THE INVENTION

1. Field of the Invention

The present invention is related to an antenna and related antenna module and related electronic device, more particularly, to a dual-polarized antenna and related antenna module and related electronic device.

2. Description of the Related Art 5G is the 5th generation mobile network, a new global wireless standard after 1G, 2G, 3G, and 4G networks. 5G enables a new kind of network capable of delivering higher multi-gigabit peak data speeds, ultra-low latency, more reliability, massive network capacity, increased availability, and a more uniform user experience to more users.

The spectrum for 5G services not only covers bands below 6 GHz, including bands currently used for 4G LTE networks, but also extends into much higher frequency bands not previously considered for mobile communications. It is the use of frequency bands in the 24 GHz to 100 GHz range (known as millimeter wave range) that provides new challenges and benefits for 5G antennas. Meanwhile, antennas used in modern portable communication equipment have other unique challenges in design theory and in implementation due to space limitation.

Therefore, there is a need of an antenna capable of operating in millimeter wave spectrum and shrinking its physical dimensions without significant performance degradation.

SUMMARY OF THE INVENTION

The present invention provides an antenna which includes a ground layer, a first coupling metal disposed on a first region over the ground layer, a second coupling metal disposed on a second region over the ground layer, a third coupling metal disposed on a third region over the ground layer, a fourth coupling metal disposed on a fourth region over the ground layer, a first polarization signal feeding terminal and a second polarization signal feeding terminal disposed on the ground layer, a first polarization structure, a second polarization structure and a first through a fourth radiating metal. The first coupling metal, the second coupling metal, the third coupling metal and the fourth coupling metal define the first region, the second region, the third region, the fourth region, a first channel, a second channel, a third channel, a fourth channel and a center region over the ground layer. The first polarization structure includes a first extending portion electrically connected to the first polarization signal feeding terminal and extending from the first channel to the second channel in a first direction on the center region over the ground layer. The second polarization structure includes a second extending portion electrically connected to the second polarization signal feeding terminal and extending from a third channel to the fourth channel in second direction on the center region over the ground layer, wherein the first extending portion crosses the second extending portion in a non-contact manner on the center region. The first radiating metal is disposed on the first channel, the second radiating metal is disposed on the second channel, the third radiating metal is disposed on the third channel, and the fourth radiating metal is disposed on the fourth channel.

The present invention also provides an antenna module which includes one or multiple antennas and one or multiple flexible printed circuit connectors each electrically connected to a feeding electrode and a ground electrode of a corresponding antenna among the one or multiple antennas.

The present invention also provides electronic device which includes a housing, a first antenna module, a second antenna module and a radio frequency unit. The first antenna module is disposed on a first location of the housing facing a first radiation direction and configured to receive a first RF signal in a first frequency band and a second RF signal in a second frequency band. The first antenna module includes one or multiple first antennas and one or multiple first FPC connectors each electrically connected to a feeding electrode and a ground electrode of a corresponding first antenna among the one or multiple first antennas. The second antenna module is disposed on a second location of the housing facing a second radiation direction and configured to receive a third RF signal in the first frequency band and a fourth RF signal in the second frequency band. The second antenna module includes one or multiple second antennas and one or multiple second FPC connectors each electrically connected to a feeding electrode and a ground electrode of a corresponding second antenna among the one or multiple second antennas. The radio frequency unit is electrically connected to the first antenna module and the second antenna module. The radio frequency module is configured to control an operation of the first antenna module based on a strength of the first RF signal and a strength of the second RF signal, and control an operation of the second antenna module based on a strength of the third RF signal and a strength of the fourth RF signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
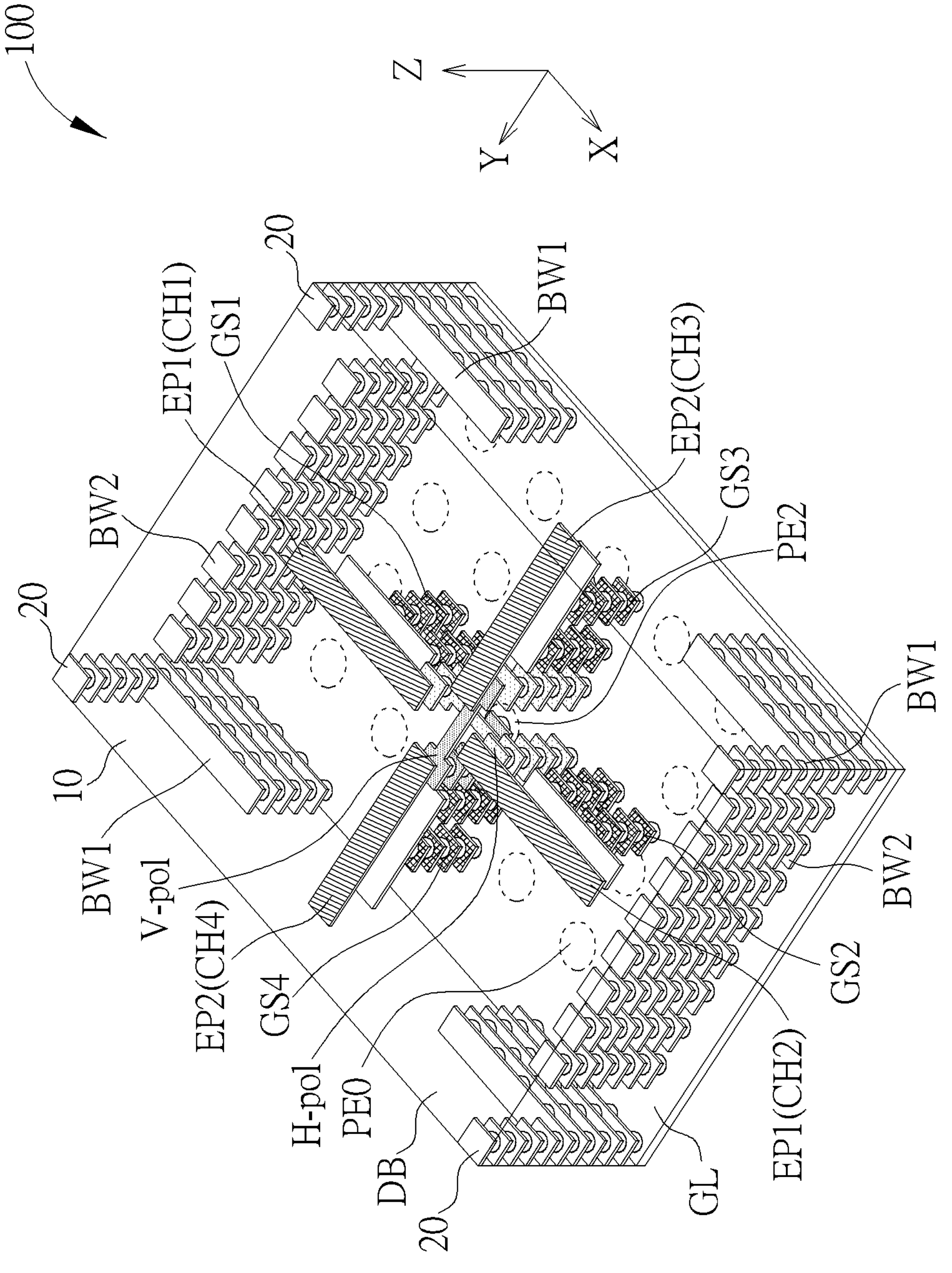
FIG. 1A is a diagram illustrating an antenna according to an embodiment of the present invention.
Figure 1B:
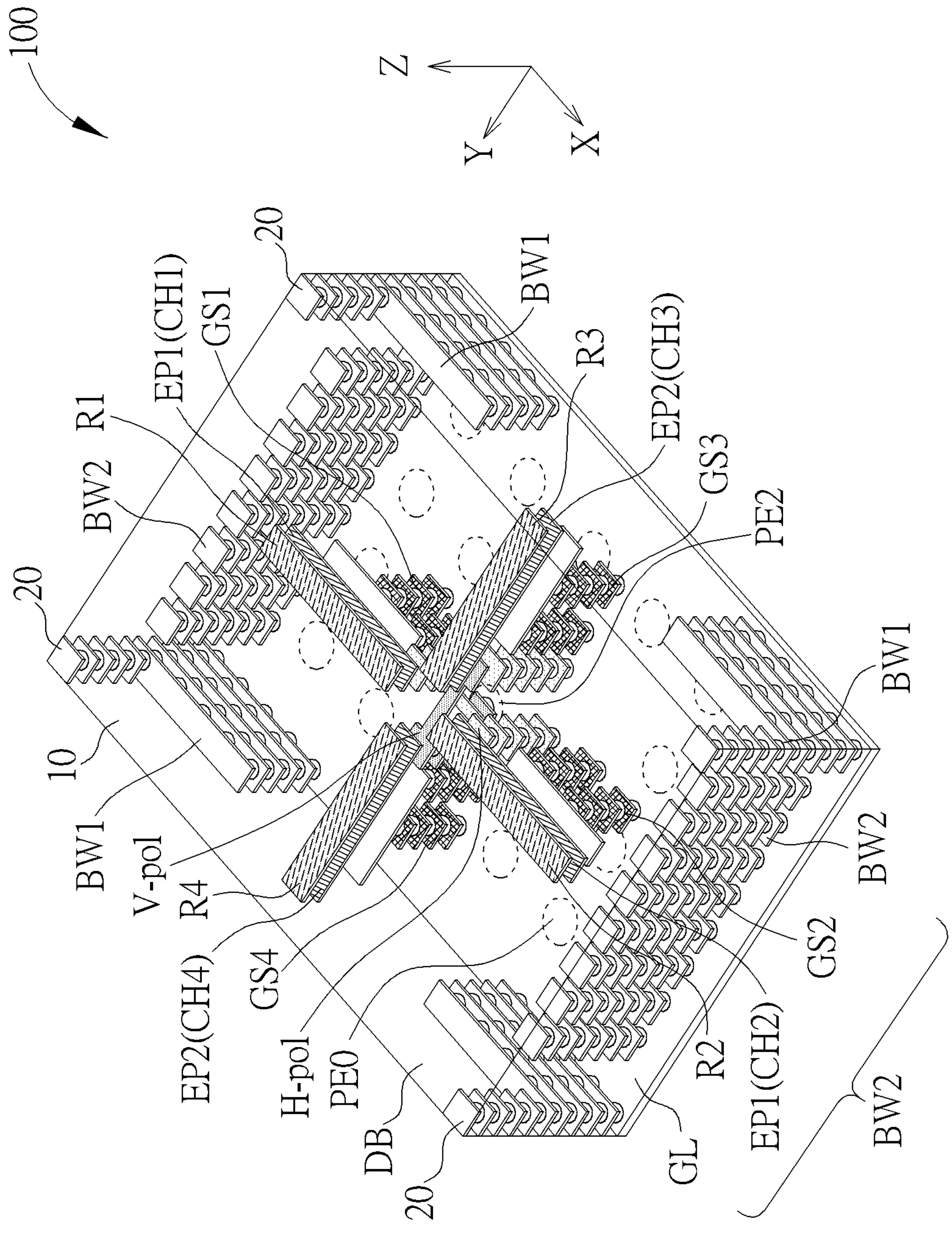
FIG. 1B is a diagram illustrating an antenna according to an embodiment of the present invention.
Figure 1C:
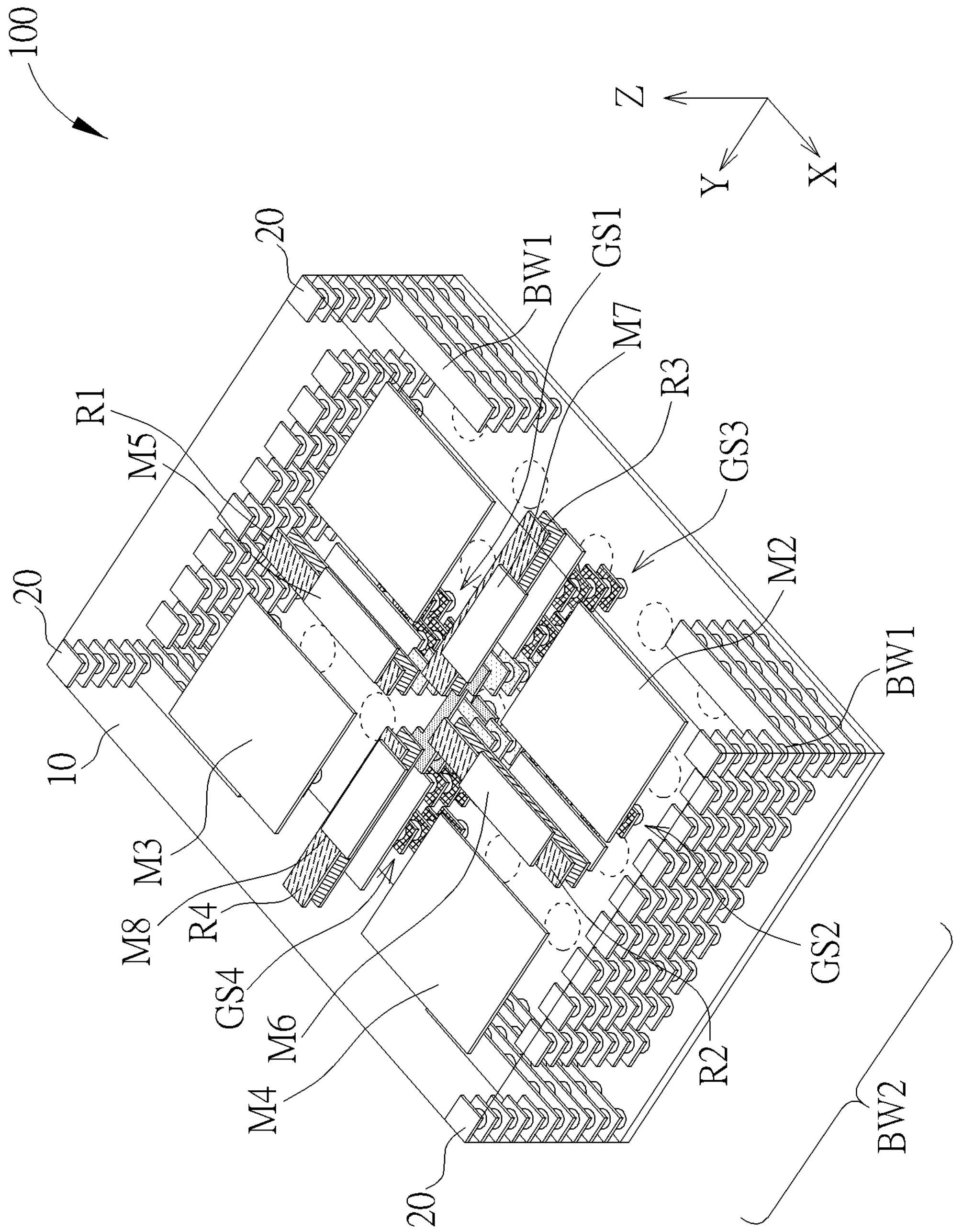
FIG. 1C is a diagram illustrating an antenna according to an embodiment of the present invention.

FIGS. 1A-1C are diagrams illustrating an antenna 100 according to an embodiment of the present invention. FIGS. 1A-1B are perspective diagrams illustrating the detailed structure of the antenna 100 according to an embodiment of the present invention. FIG. 1C is an overview perspective diagram illustrating the antenna 100 according to an embodiment of the present invention.

In the present invention, the antenna 100 is a substrate integrated waveguide (SIW) dual-polarized antenna which includes polarization structures, polarized signal feeding terminals, ground structures, coupling metals, radiating metals, isolation structures, matching structures and a ground layer GL formed on a substrate 10. The antenna 100 can provide radio frequency (RF) signals in the 24 GHz to 40 GHz range, such as the frequency band N257 (24.35 GHz-27.5 GHz), the frequency band N258 (26.5 GHz-29.5 GHz), the frequency band N260 (37 GHz-40 GHz) or the frequency band N261 (28 GHz).

As depicted in FIG. 1A, the substrate 10 may adopt a multi-layer structure which includes at least the ground layer GL and a dielectric body DB which contains the polarization signal feeding terminals, the polarization structures, the coupling metals, and the radiating metals. In an embodiment, the dielectric body DB may be ceramic compound manufactured in a low temperature cofired ceramics (LTCC) process, but not limited thereto. The dielectric constant of the dielectric body DB may be 3-10 for increasing the bandwidth of the antenna 100.

In the embodiment illustrated in FIGS. 1A-1C, the substrate 10 has a rectangular shape so as to achieve higher area occupancy percentage when multiple antennas 100 are implemented as an antenna array. In another embodiment, the substrate 10 may have a square shape, a polygonal shape or a circular shape, but not limited thereto.

The substrate 10 further includes at least one ground opening PE0, a first feeding opening PE1, and a second feeding opening PE2. At least one ground electrode FE0 (not shown in FIGS. 1A-1C) may be disposed on a mounting surface under the ground layer GL at a location corresponding to the at least one ground opening PE0, a first feeding electrode FE1 (not shown in FIGS. 1A-1C) may be disposed on the mounting surface under the ground layer GL at a location corresponding to the first feeding opening PE1, and a second feeding electrode FE2 (not shown in FIGS. 1A-1C) may be disposed on the mounting surface under the ground layer GL at a location corresponding to the second feeding opening PE2. The bottom of a first polarization signal feeding terminal H-pol is not electrically connected to the ground layer GL, but passes through the first feeding opening PE1 of the ground layer GL to be electrically connected to the first feeding electrode FE1. The bottom of a second polarization signal feeding terminal V-pol is not electrically connected to the ground layer GL, but passes through the second feeding opening PE2 of the ground layer GL to be electrically connected to the second feeding electrode FE2.

As depicted in FIG. 1A, the first polarization structure includes a first extending portion EP1 electrically connected to the first polarization signal feeding terminal H-pol and extending from a first channel CH1 to a second channel CH2 in a first direction (such as along the X-axis) over a center region of the ground layer GL. The second polarization structure includes a second extending portion EP2 electrically connected to the second polarization signal feeding terminal V-pol and extending from a third channel CH3 to a fourth channel CH4 in a second direction (such as along the Y-axis) over the center region of the ground layer GL. The first extending portion EP1 is not electrically connected to the second extending portion EP2, and the polarization signal feeding terminal H-pol is not electrically connected to the polarization signal feeding terminal V-pol.

Figure 2:
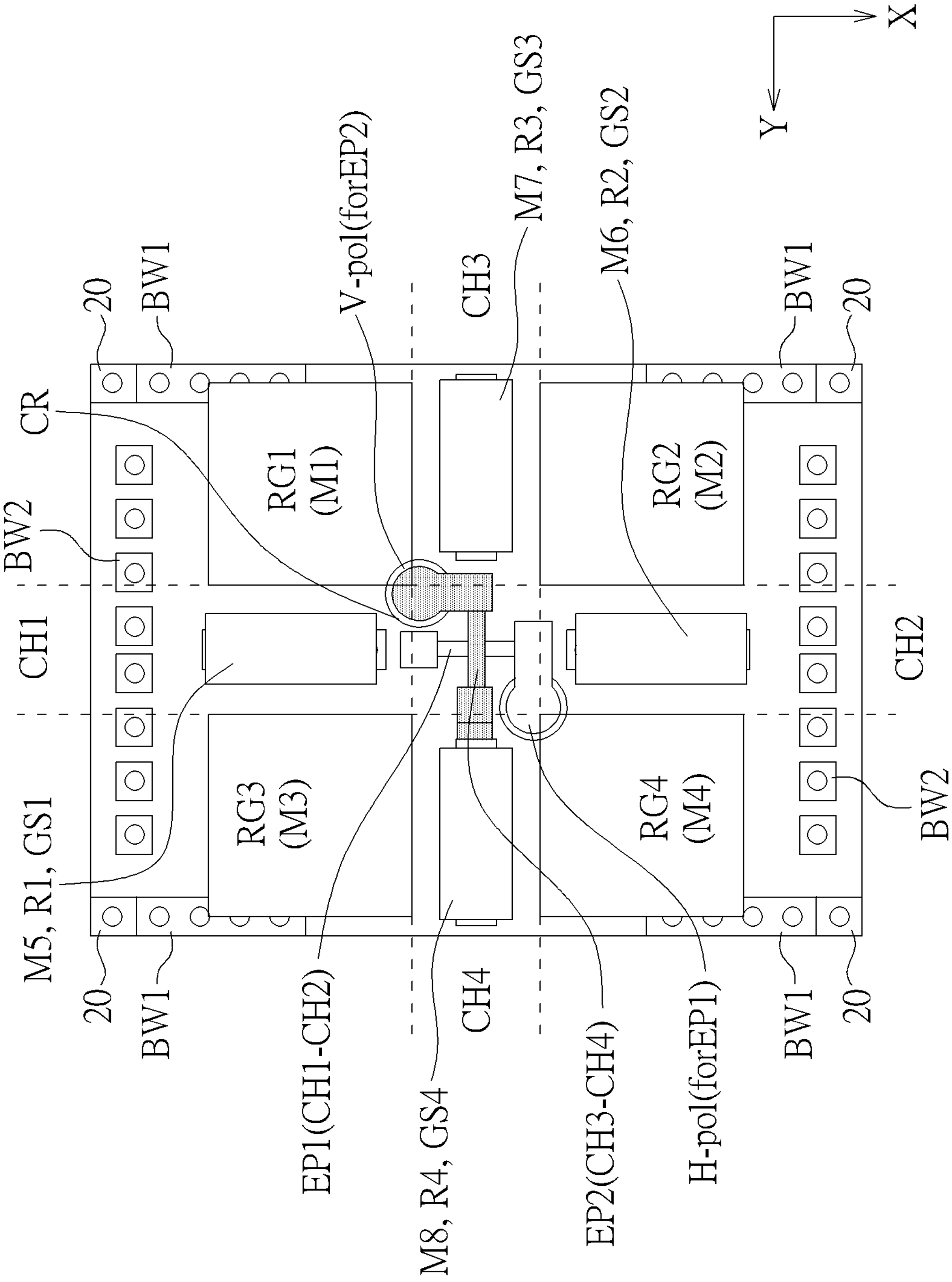
FIG. 2 is a diagram illustrating the top-view of an antenna according to an embodiment of the present invention.

FIG. 2 is a diagram illustrating the top-view of the antenna 100 according to an embodiment of the present invention. Looking towards the X-Y plane along the Z-axis, the first extending portion EP1 and the first polarization signal feeding terminal H-pol crosses the second extending portion EP2 and the second polarization signal feeding terminal V-pol at the center of the ground layer GL. The inside edges or the inside end points of the coupling metals M1-M4 divide the ground layer GL into four regions RG1-RG4 in the corner, four channels CH1~CH4 and the center region CR. More specifically, the inside edge of the first coupling metal M1 on the first region RG1 and the inside edge of the third coupling metal M3 on the third region RG3 define the first channel CH1, the inside edge of the second coupling metal M2 on the second region RG2 and the inside edge of the fourth coupling metal M4 on the fourth region RG4 define the second channel CH2, the inside edge of the first coupling metal M1 on the first region RG1 and the inside edge of the second coupling metal M2 on the second region RG2 define the third channel CH3, and the inside edge of the third coupling metal M3 on the third region RG3 and the inside edge of the fourth coupling metal M4 on the fourth region RG4 define the fourth channel CH4. In other words, the channel CH1 is located between the first region RG1 and the third region RG3, the channel CH2 is located between the second region RG2 and the fourth region RG4, the channel CH3 is located between the first region RG1 and the second region RG2, and the channel CH4 is located between the third region RG3 and the fourth region RG4.

In a preferred embodiment, the first extending portion EP1 and the second extending portion EP2 only occupy the center region CR when looking towards the X-Y plane along the Z-axis. In another embodiment, the first extending portion EP1 and the second extending portion EP2 may extend outside the center region CR and are partially overlapped with any of the coupling metals M1-M4 when looking towards the X-Y plane along the Z-axis. For example, the overlapping area of the first extending portion EP1 and the first coupling metal M1 may extend to 0-10% length of the inside edges of the first coupling metal M1, and the overlapping area of the second extending portion EP2 and the fourth coupling metal M4 may extend to 0-10% length of the inside edges of the fourth coupling metal M4, but not limited thereto.

Figure 3A:
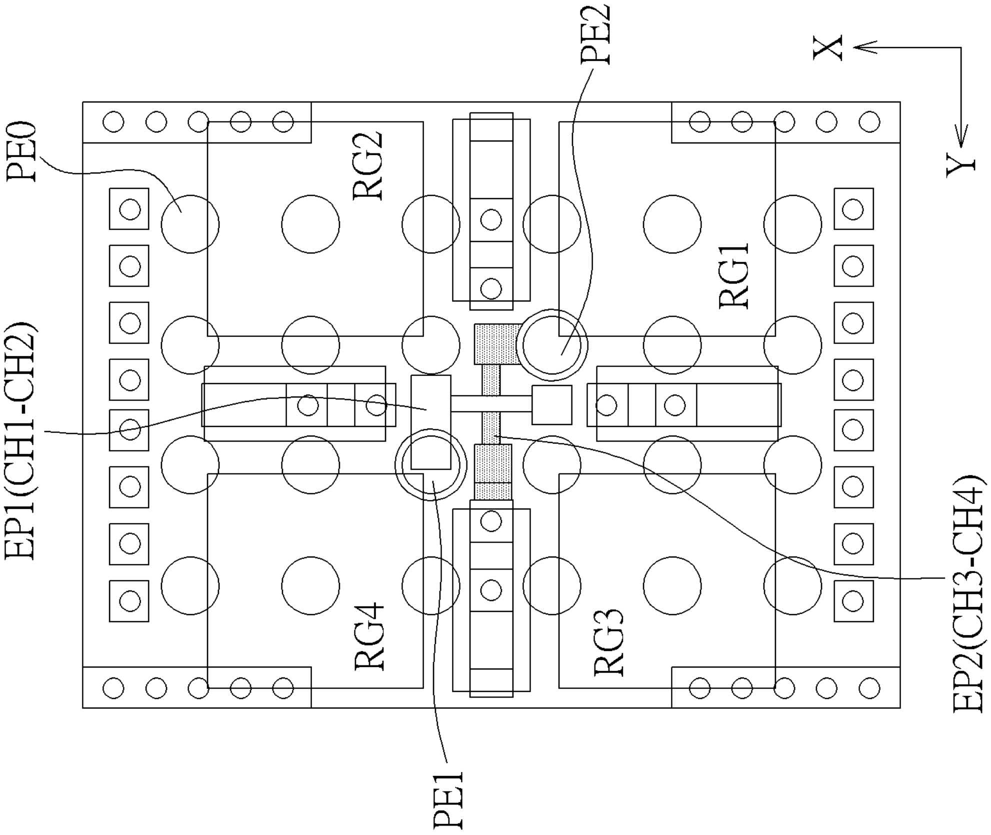
FIG. 3A is a diagram illustrating the bottom-view of the antenna according to an embodiment of the present invention.
Figure 3B:
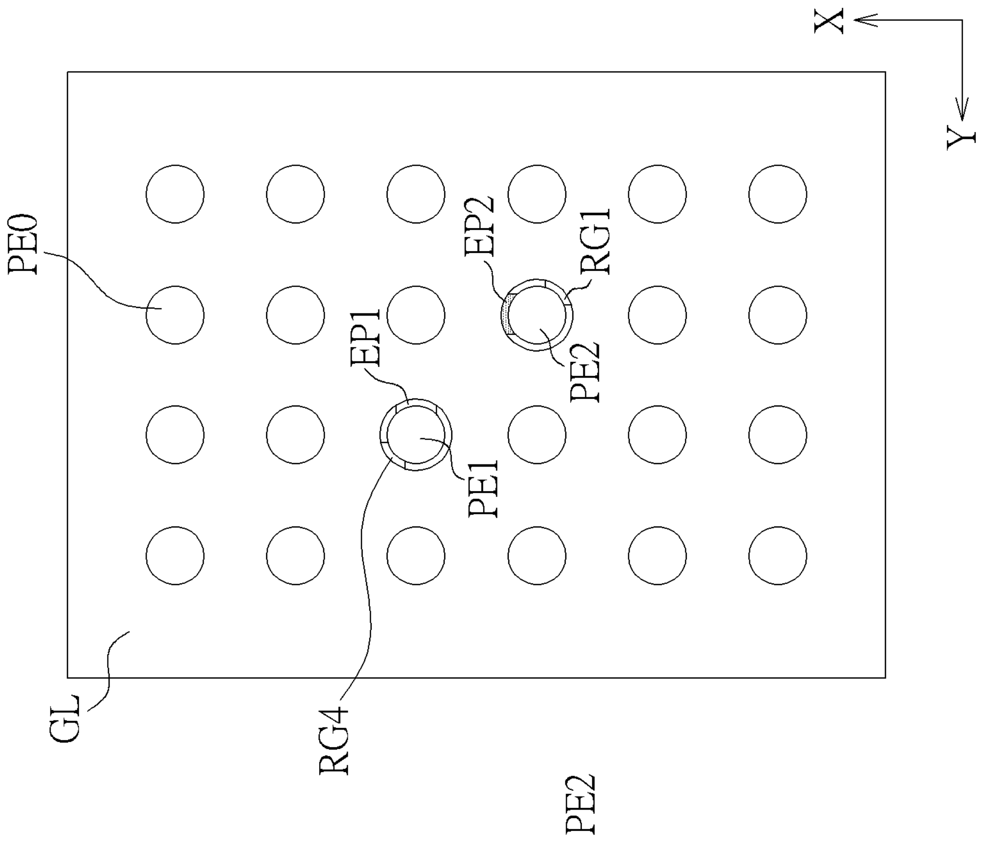
FIG. 3B is a diagram illustrating the bottom-view of an antenna according to an embodiment of the present invention.

FIGS. 3A and 3B are diagrams illustrating the bottom-views of the antenna 100 according to an embodiment of the present invention. In FIG. 3A, the ground layer GL is omitted so as to demonstrate the relative locations of the at least one ground opening PE0, the first feeding opening PE1 and the second feeding opening PE2 with respect to the regions RG1-RG4 and the channels CH1-CH4 when looking towards the X-Y plane along the Z-axis. In FIG. 3B, the ground layer GL is depicted so as to demonstrate the locations of the at least one ground opening PE0, the first feeding opening PE1 and the second feeding opening PE2 on the mounting surface under the ground layer GL. As depicted in FIGS. 3A and 3B, the bottom of the first polarization signal feeding terminal H-pol may pass through the first feeding opening PE1 to be electrically connected to the first feeding electrode FE1 (not shown in FIGS. 3A and 3B), and the bottom of the second polarization signal feeding terminal V-pol may pass through the second feeding opening PE2 to be electrically connected to the second feeding electrode FE2 (not shown in FIGS. 3A and 3B).

As depicted in FIGS. 1A and 1B, the antenna 100 may further include a first ground structure GS1 disposed adjacent to a first end of the first extending portion EP1 on the first channel CH1 under the first radiating metal R1, wherein the first ground structure GS1 includes an extending portion which extends in the first direction over the ground layer GL and is electrically connected to the ground layer GL by a connection structure. The antenna 100 may further include a second ground structure GS2 disposed adjacent to a second end of the first extending portion EP1 on the second channel CH2 under the second radiating metal R2, wherein the second ground structure GS2 includes an extending portion which extends in the first direction over the ground layer GL and is electrically connected to the ground layer GL by a connection structure. The antenna 100 may further include a third ground structure GS3 disposed adjacent to a first end of the second extending portion EP2 on the third channel CH3 under the third radiating metal R3, wherein the third ground structure GS3 includes an extending portion which extends in the second direction over the ground layer GL and is electrically connected to the ground layer GL by a connection structure. The antenna 100 may further include a fourth ground structure GS4 disposed adjacent to a second end of the second extending portion EP2 on the fourth channel CH4 under the fourth radiating metal R4, wherein the fourth ground structure GS4 includes an extending portion which extends in the second direction over the ground layer GL and is electrically. In an embodiment, the distance between the ground layer GL and each of the ground structures GS1-GS4 is smaller than the distance between the ground layer and the corresponding extending portion of each ground structure. The ground structures GS1-GS4 may lower the resonant wavelength of the antenna 100 so as to shift its operating frequency toward a lower frequency. In an embodiment, the above-mentioned connection structures may be vias and pads between the layers, but not limited thereto.

As depicted in FIG. 1B and FIG. 2, the first radiating metal R1 is disposed over the first extending portion EP1 on the first channel CH1, the second radiating metal R2 is disposed over the first extending portion EP1 on the second channel CH2, the third radiating metal R3 is disposed over the second extending portion EP2 on the third channel CH3, and the fourth radiating metal R4 is disposed over the second extending portion EP2 on the fourth channel CH4. The radiating metals R1-R4 may be electrically connected to the ground layer GL by connection structures, such as by vias and pads between the layers, but not limited thereto.

As depicted in FIG. 1C and FIG. 2, the first coupling metal M1 is disposed on the first region RG1, the second coupling metal M2 is disposed on the second region RG2, the third coupling metal M3 is disposed on the third region RG3, and the fourth coupling metal M4 is disposed on the fourth region RG4. In an embodiment, the antenna 100 may further include a fifth coupling metal M5 disposed on the first channel CH1 over the first radiating metal R1, a sixth coupling metal M6 disposed on the second channel CH2 over the second radiating metal R2, a seventh coupling metal M7 disposed above the third channel CH3 over the third radiating metal R3, and an eighth coupling metal M8 disposed on the fourth channel CH4 over the fourth radiating metal R4.

In an embodiment, the coupling metals M1-M4 are disposed in a first symmetrical manner around the center of the ground layer GL and function as a low-frequency coupler. The coupling metals M5-M8 are disposed in a second symmetrical manner around the center of the ground layer GL and function as a high-frequency coupler. The radiating metals R1-R4 are disposed in a third symmetrical manner around the center of the ground layer GL and form a resonant body.

In the antenna 100 of the present invention, the radiating metals R1-R4 and the coupling metals M5-M8 are not electrically connected to the first extending portion EP1, the second extending portion EP2, the first polarization signal feeding terminal H-pol and the second polarization signal feeding terminal V-pol. In a preferred embodiment, the radiating metals R1-R4 and the coupling metals M5-M8 are not overlapped with the first extending portion EP1 and the second extending portion EP2 when looking towards the X-Y plane along the Z-axis. In another embodiment, the coupling metals M5-M8 are at least partially overlapped with the first extending portion EP1 and the second extending portion EP2 when looking towards the X-Y plane along the Z-axis. For example, the overlapping area of the coupling metals M5-M8, the first extending portion EP1 and the second extending portion EP2 may extend to 0-5% length of the inside edges of the fifth through the eighth coupling metals M5-M8, but bot limited thereto.

As depicted in FIGS. 1A-1C, the antenna 100 may further include an isolation structure. In an embodiment, the isolation structure may include four isolation components 20 disposed on the four corners of the ground layer GL. In an embodiment, each isolation component 20 may be formed by stacking multiple sheet metals along the Z-axis, but not limited thereto. In an embodiment, the distance between the ground layer GL and the top of each isolation component 20 is larger than the distance between the ground layer GL and each of the coupling metals M1-M4, the distance between the ground layer GL and each of the coupling metals M5-M8 and/or the distance between the ground layer GL and each of the radiating metals R1-R4. Therefore, when multiple antennas 100 are arranged as an antenna array, the isolation structure of each antenna 100 may improve signal isolation between different antennas 100.

As depicted in FIGS. 1A-1C, the antenna 100 may further include a matching structure. In an embodiment, the matching structure may include one or multiple matching components BW1 disposed adjacent to a border of the ground layer GL along the X-axis and one or multiple matching components BW2 disposed adjacent to a border of the ground layer GL along the Y-axis. The one or multiple matching components BW1 can improve the vertical polarization (V-polarization) of the antenna 100, and the one or multiple matching components BW2 can improve the horizontal polarization (H-polarization) of the antenna 100. In an embodiment, each matching component may be formed by stacking multiple sheet metals along the Z-axis, but not limited thereto. In an embodiment, each matching component may be formed in the shape of a wall, a fence or a rail, but not limited thereto. In an embodiment, each matching component is not disposed on any of the channels CH1-CH4 in order not to affect the radiation efficiency of the antenna 100.

As previously stated, the first polarization structure includes the first extending portion EP1 electrically connected to the first polarization signal feeding terminal H-pol and extending from the first channel CH1 to the second channel CH2 in the first direction, and the second polarization structure includes the second extending portion EP2 electrically connected to the second polarization signal feeding terminal V-pol and extending from the third channel CH3 to the fourth channel CH4 in the second direction. In an embodiment, the first direction is parallel to the X-axis, and the second direction is parallel to the Y-axis, as depicted in FIG. 2.

Figure 4:
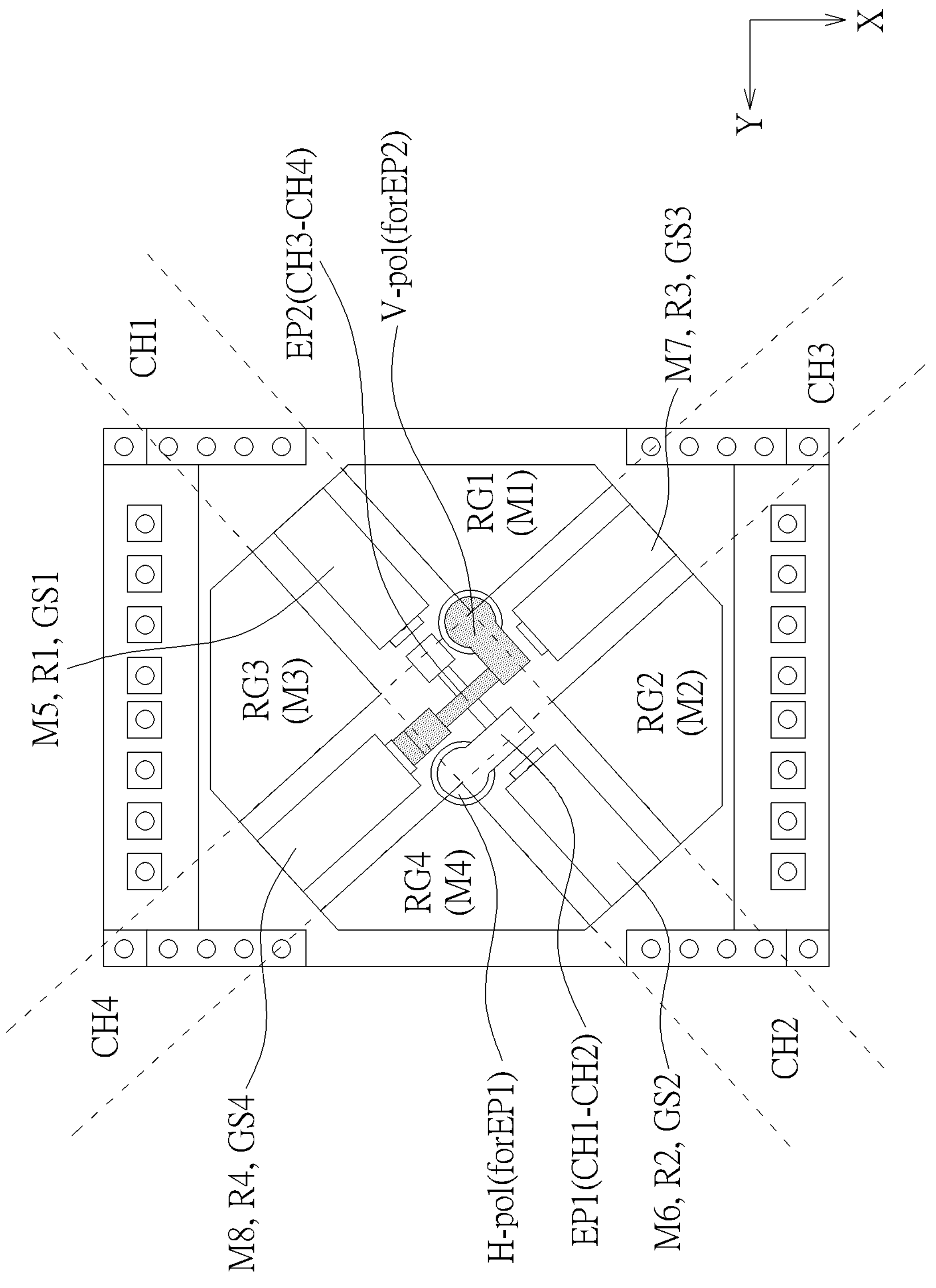
FIG. 4 is a diagram illustrating the top-view of an antenna according to another embodiment of the present invention.

FIG. 4 is a diagram illustrating the top-view of the antenna 100 according to another embodiment of the present invention. Looking towards the X-Y plane along the Z-axis, the first extending portion EP1/the first polarization signal feeding terminal H-pol crosses the second extending portion EP2/the second polarization signal feeding terminal V-pol at the center of the ground layer GL. However, the first direction is at a first angle (such as 45 degrees) with respect to the X-axis, and the second direction is at a second angle (such as 45 degrees) with respect to the Y-axis. However, the angular relationship between the first direction and the X-axis or the angular relationship between the second direction and the Y-axis does not limit the scope of the present invention.

In an embodiment illustrated in FIGS. 1A-1C, 2, 3A and 4, the first direction is perpendicular to the second direction. In another embodiment, the angular difference between the first direction and the second direction may be between 60 and 120 degrees, but not limited thereto.

Figure 5A:
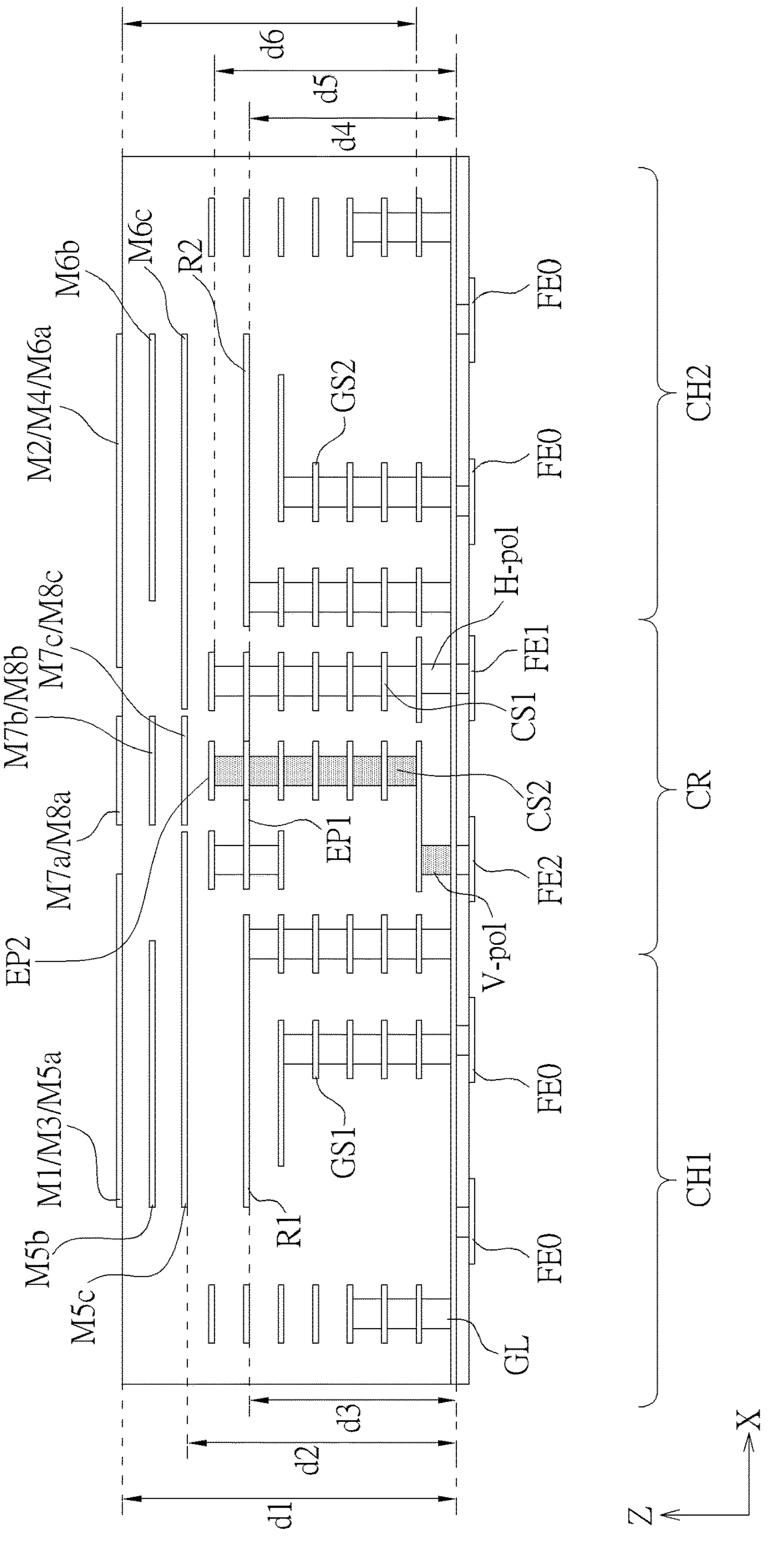
FIG. 5A is a diagram illustrating the lateral view of an antenna when looking towards the X-Z plane along the Z-axis according to an embodiment of the present invention.
Figure 5B:
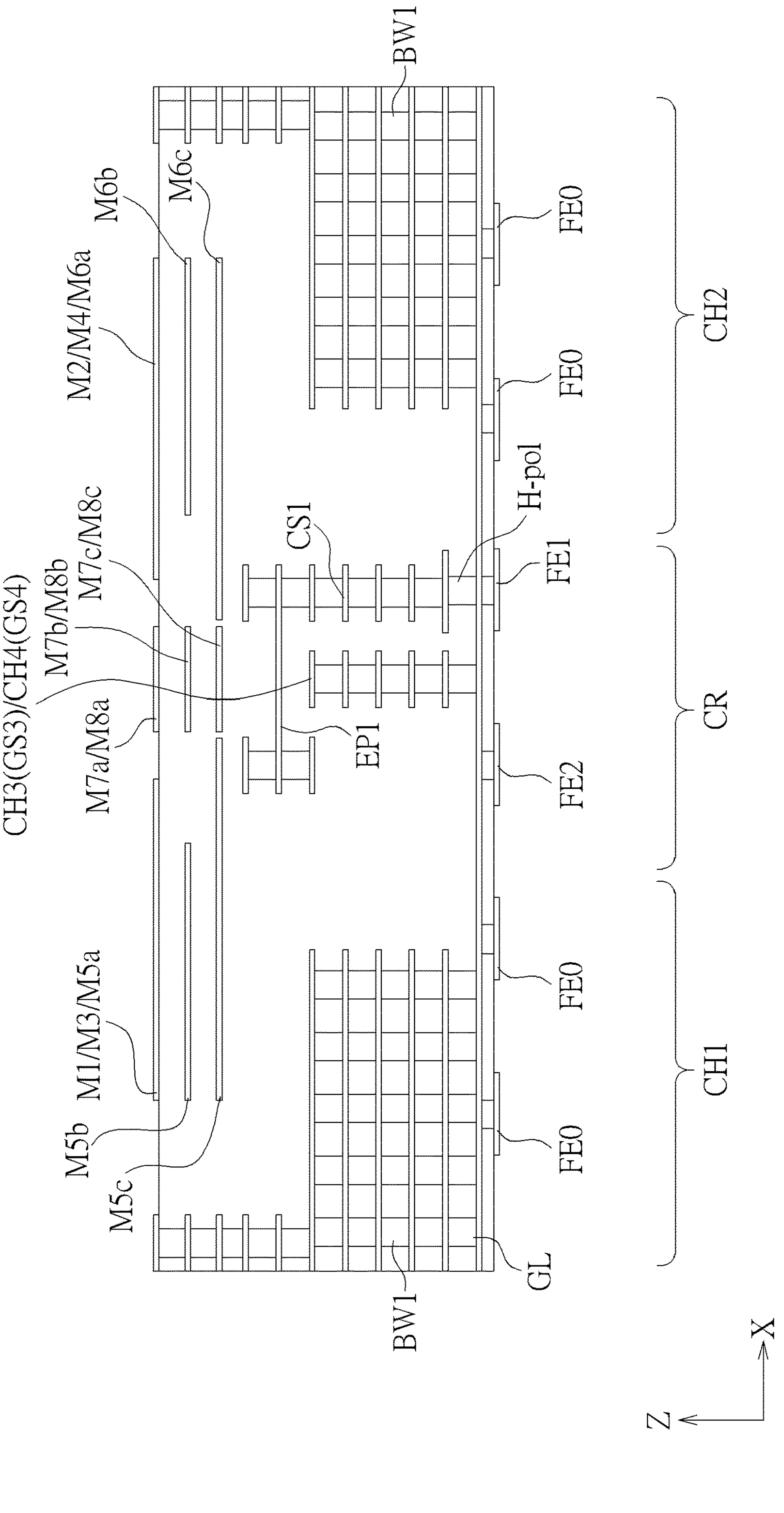
FIG. 5B is a diagram illustrating the lateral view of an antenna when looking towards the X-Z plane along the Z-axis according to an embodiment of the present invention.

FIGS. 5A and 5B are diagrams illustrating the lateral views of the antenna 100 when looking towards the X-Z plane along the Z-axis according to an embodiment of the present invention. In FIG. 5A, the isolation component 20, the matching components BW1, the third ground structure GS3 and the third resonant metal R3 over the third channel CH3, and the fourth ground structure GS4 and the fourth resonant metal R4 over the fourth channel CH4 are omitted for better demonstrating the antenna structure within the center region CR. In FIG. 5B, the matching components BW2, the ground structure GS1 and the first resonant metal R1 over the first channel CH1, the ground structure GS2 and the second resonant metal R2 over the second channel CH2, the third resonant metal R3 over the third channel CH3, and the fourth resonant metal R4 over the fourth channel CH4 are omitted for better demonstrating the antenna structure within the center region CR.

Figure 6A:
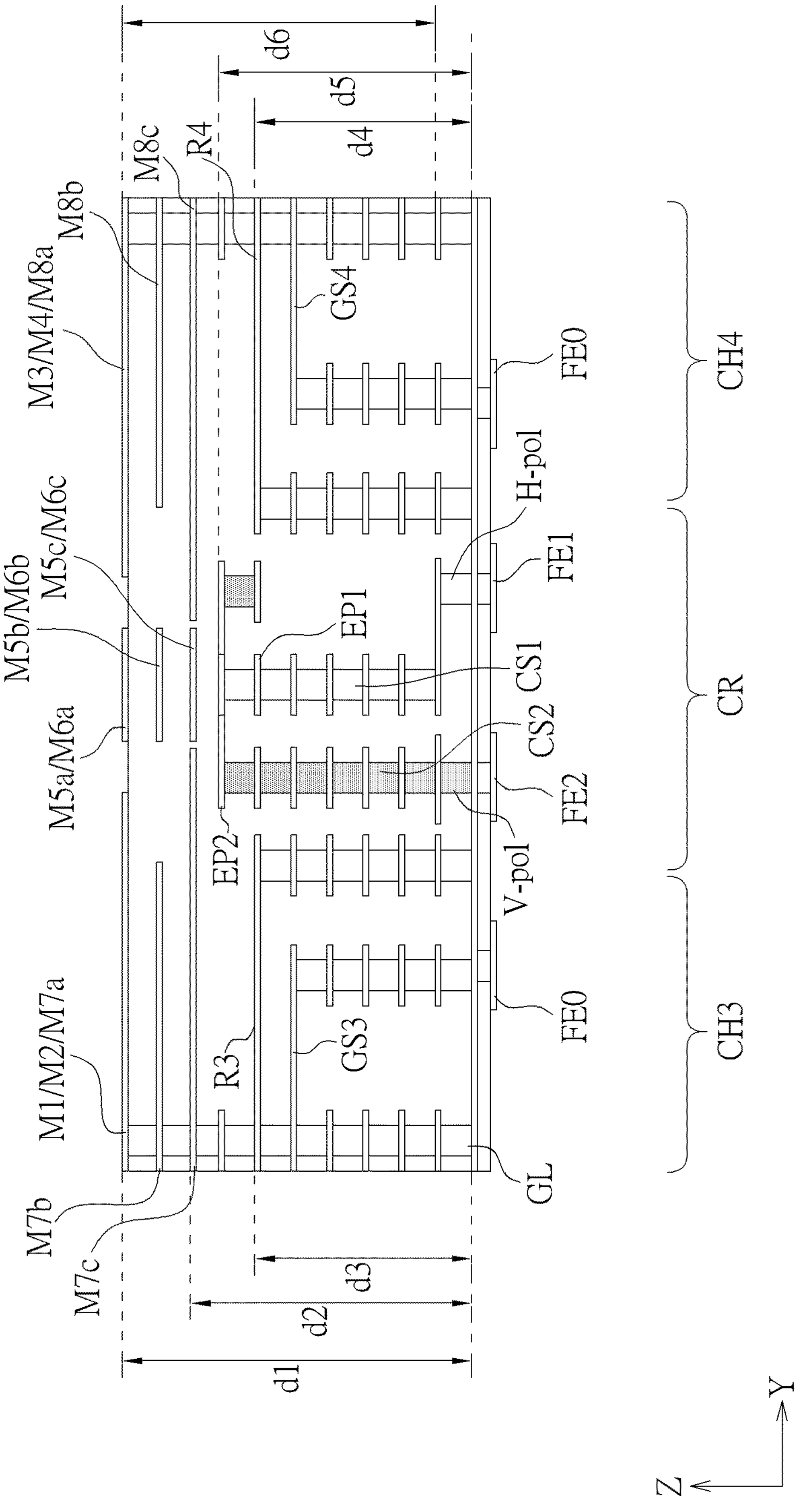
FIG. 6A is a diagram illustrating the lateral view of an antenna when looking towards the Y-Z plane along the Z-axis according to an embodiment of the present invention.
Figure 6B:
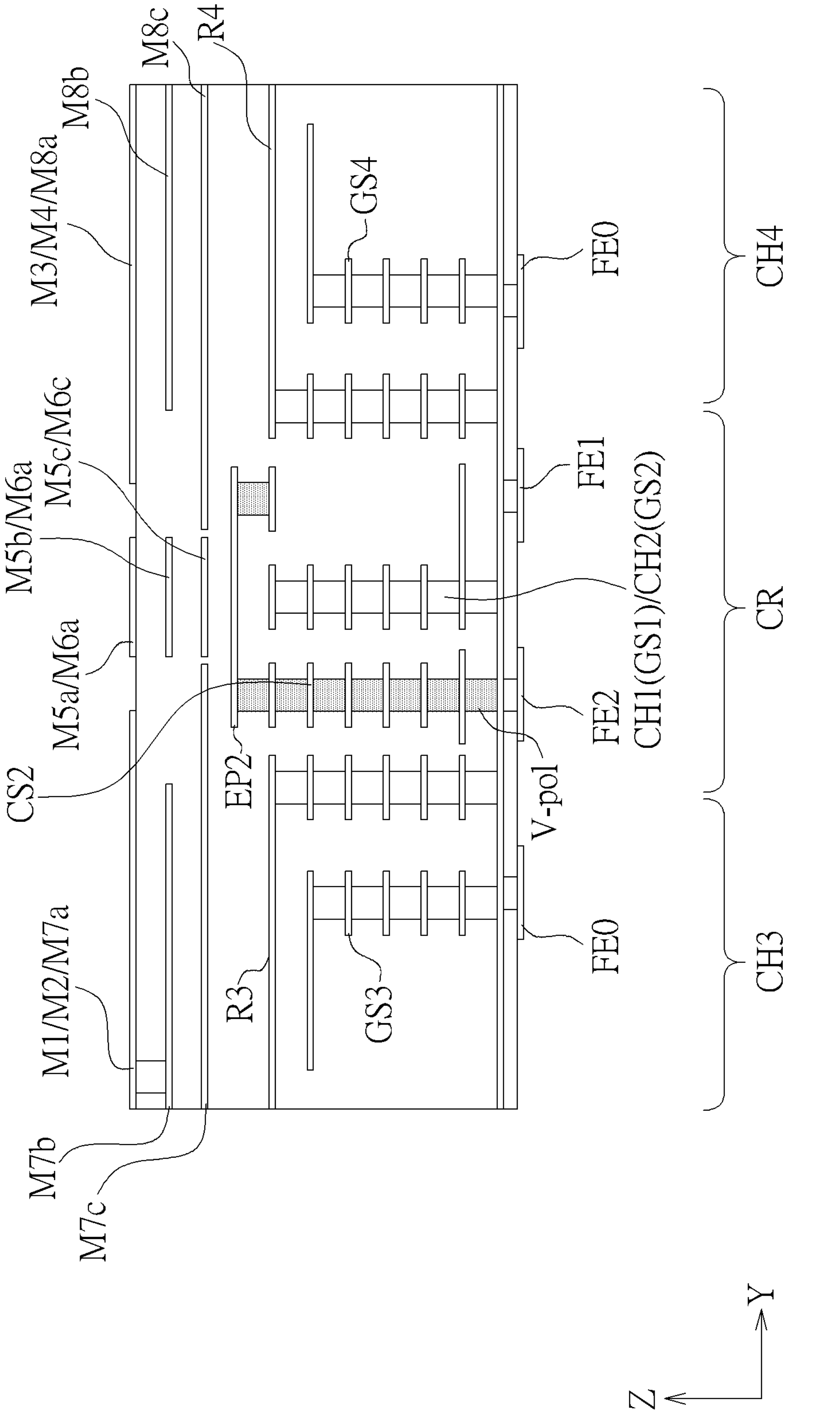
FIG. 6B is a diagram illustrating the lateral view of an antenna when looking towards the Y-Z plane along the Z-axis according to an embodiment of the present invention.

FIGS. 6A and 6B are diagrams illustrating the lateral views of the antenna 100 when looking towards the Y-Z plane along the Z-axis according to an embodiment of the present invention. In FIG. 6A, the matching components BW2, the first ground structure GS1 and the first resonant metal R1 over the first channel CH1, the ground structure GS2 and the second resonant metal R2 over the second channel CH2 are omitted for better demonstrating the structures within the center region CR. In FIG. 6B, the isolation component 20, the matching components BW1-BW2, and the some structure over the first extending portion EP1 are omitted for better demonstrating the structures within the center region CR.

In an embodiment, each of the coupling metals M5-M8 may be formed as a single metal layer or by stacking multiple sheet metals along the Z-axis. For illustrative purpose, it is assumed that the coupling metal M5 include 3 sheet metals M5a-M5c, the coupling metal M6 include 3 sheet metals M6a-M6c, the coupling metal M7 include 3 sheet metals M7a-M7c, and the coupling metal M8 include 3 sheet metals M8a-M8c, as depicted in FIGS. 5A, 5B, 6A and 6B. However, the structures of the coupling metals M5-M8 do not limit the scope of the present invention.

As depicted in FIGS. 5A, 5B, 6A and 6B, the antenna 100 further include a first connection structure CS1 for electrically connecting the first extending portion EP1 to the first polarization signal feeding terminal H-pol and a second connection structure CS2 for electrically connecting the second extending portion EP2 to the second polarization signal feeding terminal V-pol.

For illustrative purpose, d1 represents the distance between the ground layer GL and each of the coupling metals M1-M4, d2 represents the distance between the ground layer GL and each of the coupling metals M5-M8, d3 represents the distance between the ground layer GL and each of the radiating metals R1-R4, d4 represents the distance between the ground layer GL and the first extending portion EP1, d5 represents the distance between the ground layer GL and the second extending portion EP2, and d6 represents the distance between the polarization signal feeding terminals V-pol/H-pol and the coupling metals M1-M4. In an embodiment, the coupling metals M1-M4, the coupling metals M5-M8 and the radiating metals R1-R4 have different heights with respect to the ground layer GL ($d1 \neq d2 \neq d3$). In an embodiment, the coupling metals M1-M4 and the coupling metals M5-M8 have the same height with respect to the ground layer GL ($d1 = d2$). In an embodiment, the first extending portion EP1 and the second extending portion EP2 are disposed between the coupling metals M1-M4 and the radiating metals R1-R4 (d1 is larger than d4 and d5; d3 is smaller than d4 and d5). In an embodiment, the first extending portion EP1 is disposed closer to the ground layer GL than the second extending portion EP2 ($d4 < d5$).

In an embodiment, the distance d6 between the polarization signal feeding terminals V-pol/H-pol and the coupling metals M1-M4 is larger than 100 μm. In an embodiment, no other conducting component except the first connection structure CS1 and the second connection structure CS2 is disposed between the ground layer GL and the coupling metals M1-M4.

Figure 7:
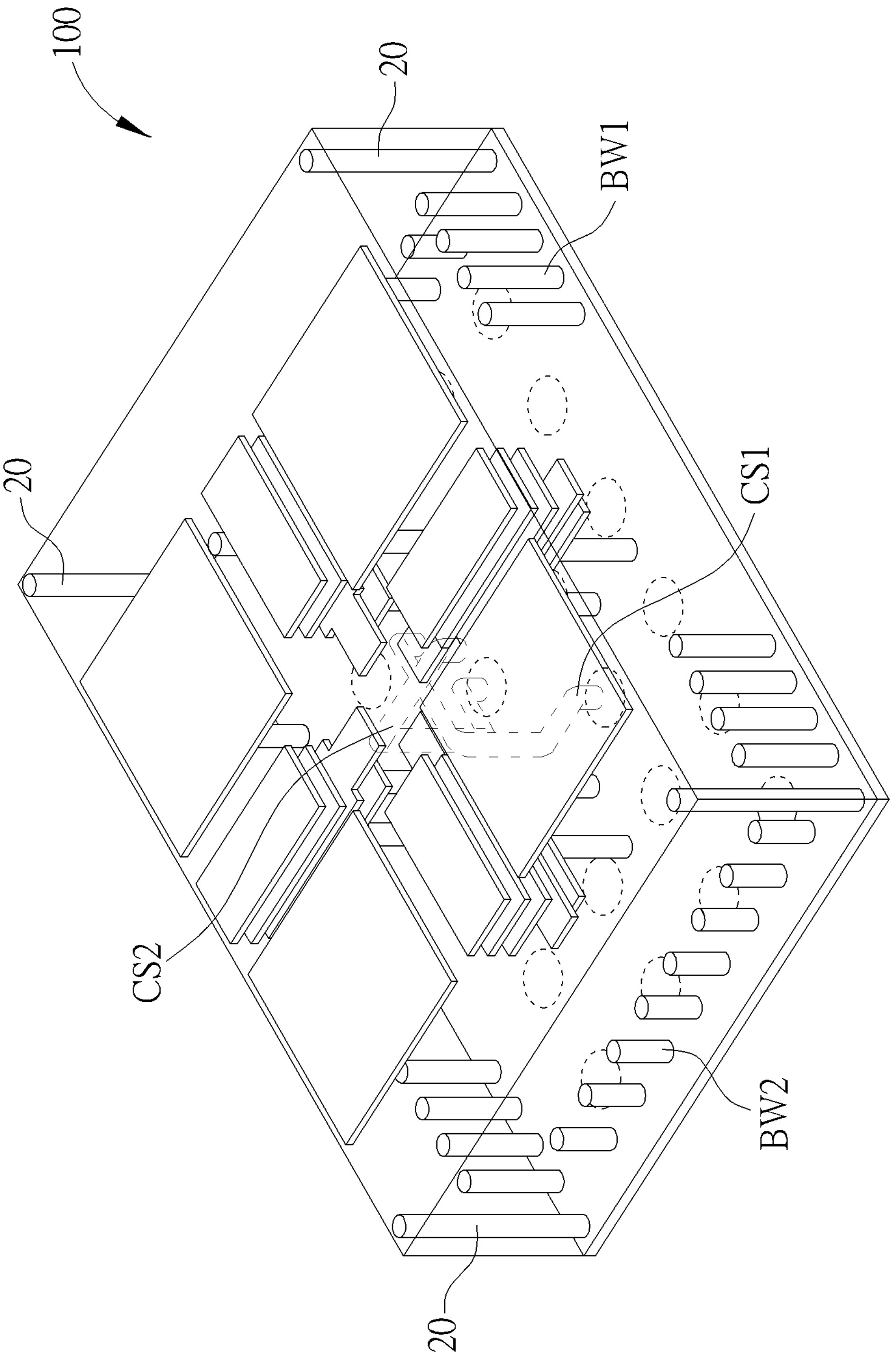
FIG. 7 is a diagram illustrating an antenna according to another embodiment of the present invention.

FIG. 7 is an overview perspective diagram illustrating the antenna 100 according to another embodiment of the present invention. In the embodiment depicted in FIGS. 1A-1C, each isolation component 20, each of the matching components BW1 and BW2, and each of the connecting structures CS1 and CS2 are formed by stacking multiple sheet metals along the Z-axis. In the embodiment depicted in FIG. 7, each isolation component 20, each of the matching components BW1 and BW2, and each of the connecting structures CS1 and CS2 are formed as integral structures, such as cylinders. However, the shape of each isolation component 20, each of the matching components BW1 and BW2, or each of the connecting structures CS1 and CS2 formed as integral structures does not limit the scope of the present invention.

Figure 8:
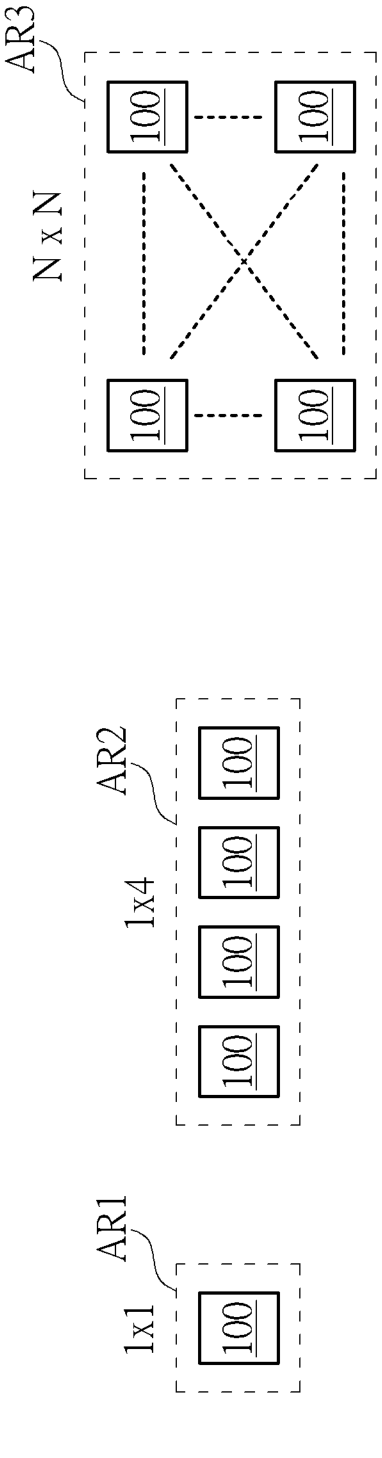
FIG. 8 is a diagram illustrating antenna arrays according to embodiments of the present invention.

FIG. 8 is a diagram of antenna arrays AR1-AR3 according to embodiments of the present invention. Each antenna array may include one or multiple antennas 100 depicted in FIG. 1A-1C or 7. The antenna array AR1 includes one antenna 100, as depicted on the left of FIG. 8. The antenna array AR2 includes four antennas 100 arranged in a 1×4 array, as depicted in the middle of FIG. 8. The antenna array AR3 includes $N^2$ antennas 100 arranged in an N×N array, as depicted on the right of FIG. 8, wherein N is an integer larger than 1. However, the number or the layout of the antennas 100 in the antenna arrays AR1-AR3 does not limit the scope of the present invention.

Figure 9:
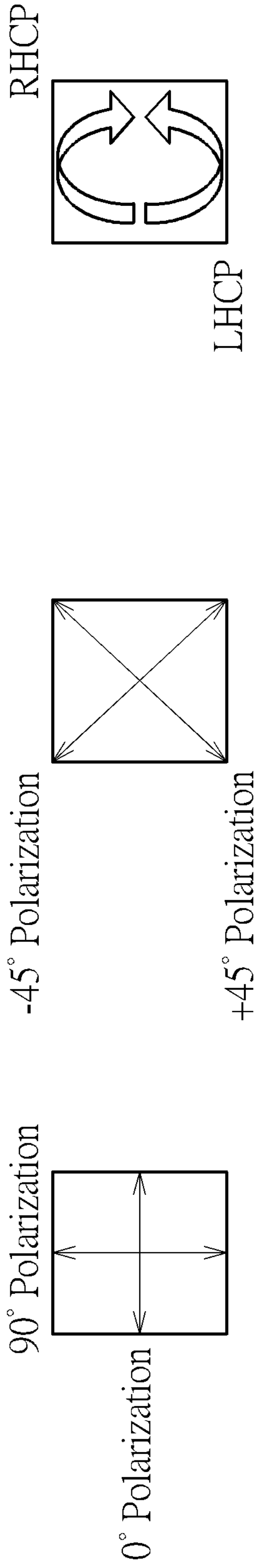
FIG. 9 is a diagram illustrating the polarization types of the antenna arrays according to embodiments of the present invention

FIG. 9 is a diagram illustrating the polarization types of the antenna arrays AR1-AR3 according to embodiments of the present invention. Each antenna included in the antenna arrays AR1-AR3 may have a linear polarization (90°/0° polarization) as depicted on the left of FIG. 9, a slant polarization (−45°/+45° polarization) as depicted in the middle of FIG. 9, or a right hand circular polarization (RHCP)/left hand circular polarization (LHCP) as depicted on the right of FIG. 9. However, the polarization type of each antenna in the antenna arrays AR1-AR3 does not limit the scope of the present invention.

Figure 10:
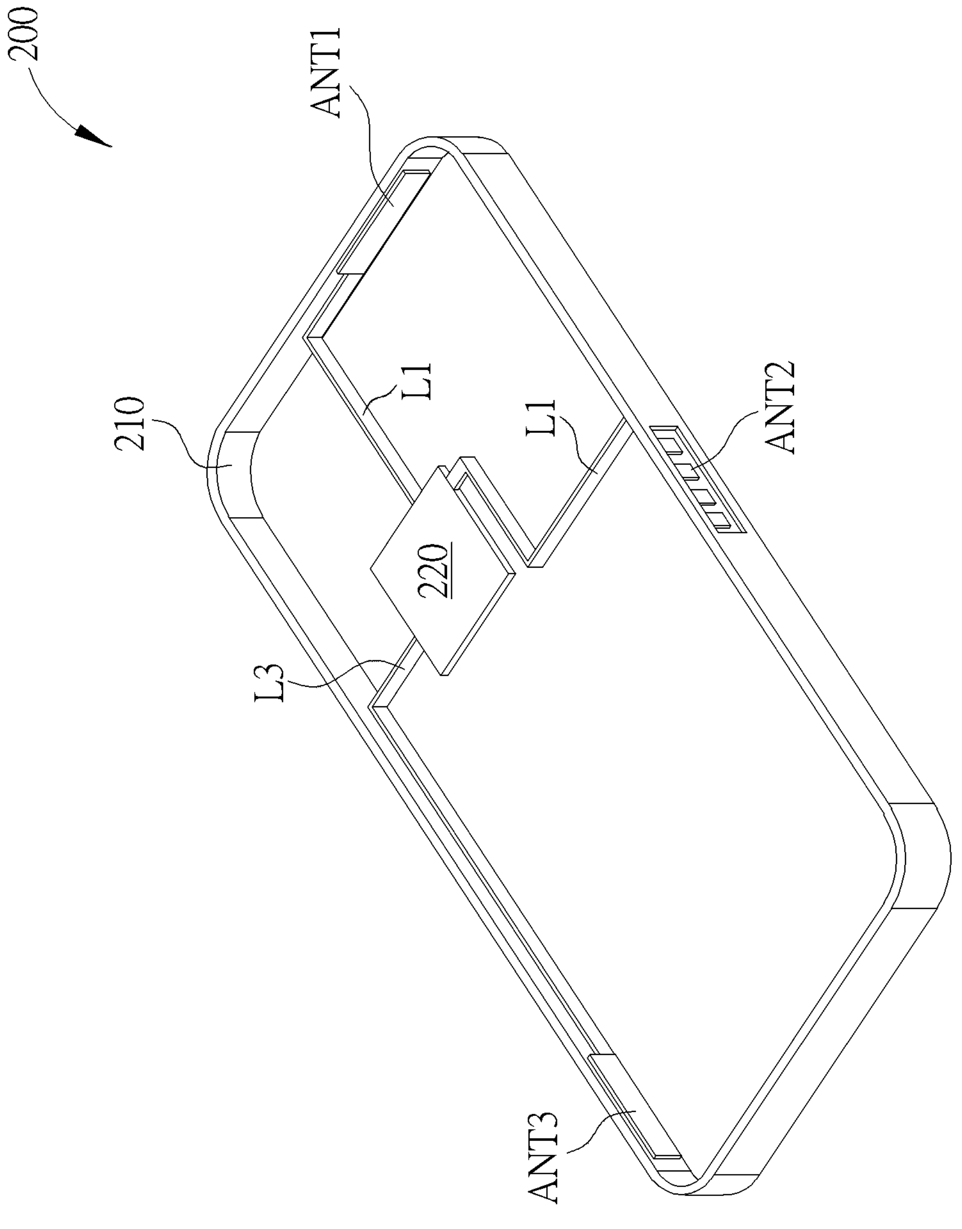
FIG. 10 is a diagram of an electronic device according to an embodiment of the present invention.

FIG. 10 is a diagram of an electronic device 200 according to an embodiment of the present invention. The electronic device 200 includes a housing 210, a radio frequency (RF) unit 220, connecting lines L1-Ln, and antenna arrays ANT1-ANTn, wherein n is an integer larger than 1. Each of the antenna arrays ANT1-ANTn may include one or multiple antennas 100 depicted in FIG. 1A-1C or 7 in the configuration depicted in FIG. 8. Each of the connecting lines L1-Ln may be a flexible printed circuit (FPC) connector, but not limited thereto. Each connecting line is electrically connected to a feeding electrode and a ground electrode of a corresponding antenna array. For illustrative purpose, FIG. 10 depicts an embodiment when n=3, wherein the antenna arrays ANT1-ANT3 are disposed on different sides of the housing 210 facing different radiation directions.

The antenna array ANT1 and the connecting line L1 forms a first antenna module capable of operating in multiple frequency bands. The antenna array ANT2 and the connecting line L2 forms a second antenna module capable of operating in multiple frequency bands. The antenna array ANT3 and the connecting line L3 forms a third antenna module capable of operating in multiple frequency bands. Based on the RF signals received from the antenna array ANT1 via the connecting line L1, the RF signals received from the antenna array ANT2 via the connecting line L2, and the RF signals received from the antenna array ANT3 via the connecting line L3, the RF unit 220 is configured control the operation of each antenna module based on its signal strength in each frequency band.

Figure 11C:
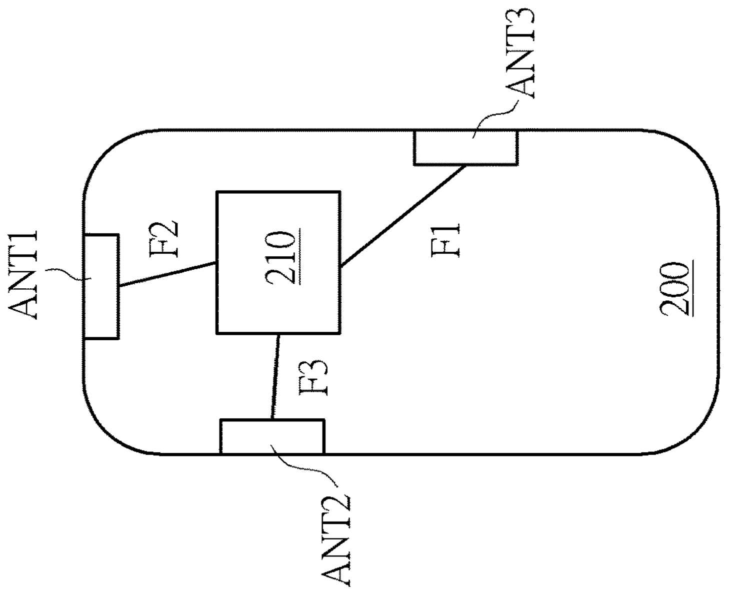
FIG. 11C is a diagram illustrating the operation of an electronic device according to another embodiment of the present application.
Figure 11B:
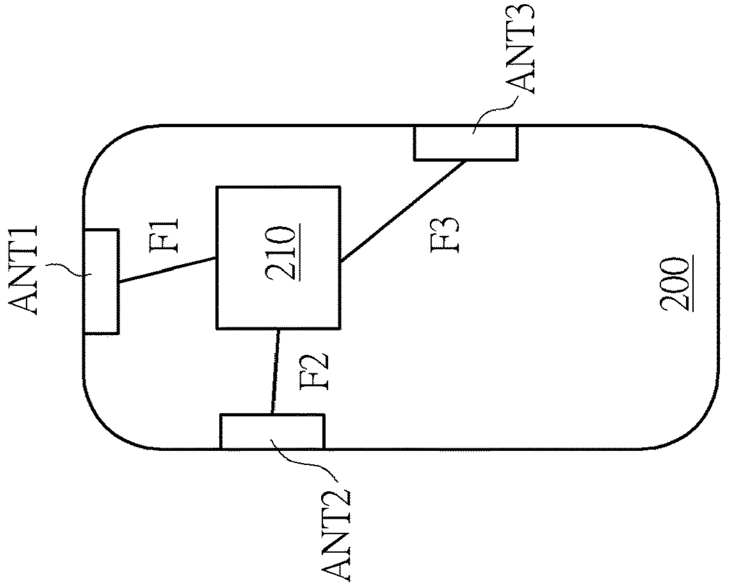
FIG. 11B is a diagram illustrating the operation of an electronic device according to another embodiment of the present application.
Figure 11A:
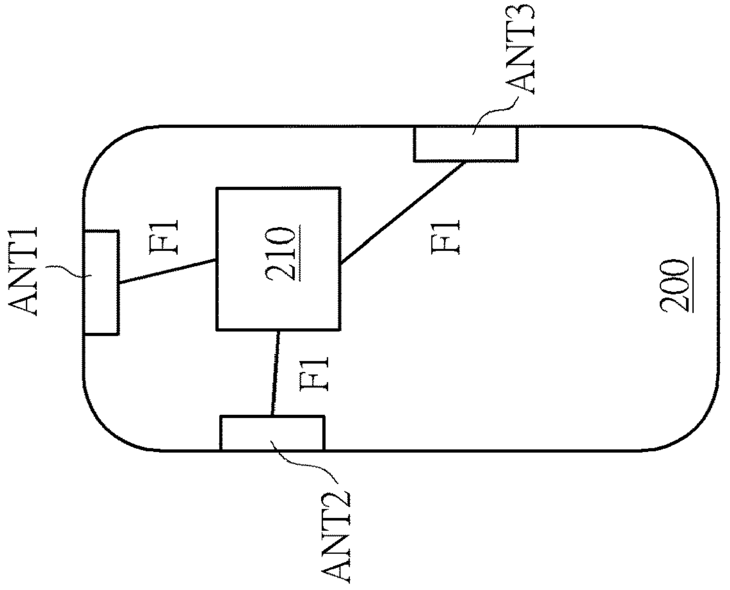
FIG. 11A is a diagram illustrating the operation of an electronic device according to an embodiment of the present application.

FIGS. 11A-11C are diagrams illustrating the operation of the electronic device 200 according to embodiments of the present application. For illustrative purpose, it is assumed that each of the antenna arrays ANT1-ANT3 may operate in three different frequency bands F1-F3. In an embodiment, the first frequency band F1 may be the frequency band N257 (24.35 GHz-27.5 GHz), the second frequency band F2 may be the frequency band N258 (26.5 GHz-29.5 GHz), and the third frequency band F3 may be the frequency band N260 (37 GHz-40 GHz), but not limited thereto.

The RF unit 220 is configured to control the operation of each antenna array based on the signal strength of each antenna array in different frequency bands. In the embodiment illustrated in FIG. 11A, when determining that all antenna arrays ANT1-ANT3 receive the strongest RF signals in the first frequency band F1, the RF unit 220 is configured to control all antenna arrays ANT1-ANT3 to operate in the first frequency band F1.

In the embodiment illustrated in FIG. 11B, when determining that the antenna array ANT1 receives the strongest RF signals in the first frequency band F1, the antenna array ANT2 receives the strongest RF signals in the second frequency band F2, and the antenna array ANT3 receives the strongest RF signals in the third frequency band F3, the RF unit 220 is configured to control the antenna array ANT1 to operate in the first frequency band F1, control the antenna array ANT2 to operate in the second frequency band F2, and control the antenna array ANT3 to operate in the third frequency band F3.

In the embodiment illustrated in FIG. 11C, when determining that the antenna array AR1 receives the strongest RF signals in the second frequency band F2, the antenna array AR2 receives the strongest RF signals in the third frequency band F3, and the antenna array AR3 receives the strongest RF signals in the first frequency band F1, the RF unit 220 is configured to control the antenna array AR1 to operate in the second frequency band F2, control the antenna array AR2 to operate in the third frequency band F3, and control the antenna array AR3 to operate in the first frequency band F1.

In conclusion, the present invention provides an antenna, a related antenna module and a related electronic device capable of operating in millimeter wave range spectrum with high efficiency. Antenna miniaturization can also be achieved by incorporating the components associated with the V-polarization and the H-polarization into a multi-layer structure.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna, comprising:

a ground layer;

a first coupling metal disposed on a first region over the ground layer;

a second coupling metal disposed on a second region over the ground layer;

a third coupling metal disposed on a third region over the ground layer;

a fourth coupling metal disposed on a fourth region over the ground layer, wherein the first coupling metal, the second coupling metal, the third coupling metal and the fourth coupling metal define the first region, the second region, the third region, the fourth region, a first channel, a second channel, a third channel, a fourth channel and a center region over the ground layer;

a first polarization signal feeding terminal and a second polarization signal feeding terminal disposed over the ground layer;

a first polarization structure having a first extending portion electrically connected to the first polarization signal feeding terminal and extending from the first channel to the second channel in a first direction on the center region over the ground layer;

a second polarization structure having a second extending portion electrically connected to the second polarization signal feeding terminal and extending from the third channel to the fourth channel in second direction on the center region over the ground layer, wherein the first extending portion crosses the second extending portion in a non-contact manner to define the first region, the second region, the third region and the fourth region;

a first radiating metal disposed on the first channel;

a second radiating metal disposed on the second channel;

a third radiating metal disposed on the third channel; and a fourth radiating metal disposed on the fourth channel.

2. The antenna of claim 1, further comprising:

a fifth coupling metal disposed on the first channel;

a sixth coupling metal disposed on the second channel;

a seventh coupling metal disposed on the third channel; and an eighth coupling metal disposed on the fourth channel, wherein the first through the eighth coupling metals are not electrically connected to the ground layer, the first polarization signal feeding terminal or the second polarization signal feeding terminal.

3. The antenna of claim 2, wherein:

a distance between the ground layer and each of the first through the fourth coupling metals is equal to a first value;

a distance between the ground layer and each of the fifth through the eighth coupling metals is equal to a second value; and a distance between the ground layer and each of the first through the fourth radiating metals is equal to a third value.

4. The antenna of claim 3, wherein:

a distance between the ground layer the first extending portion is equal to a fourth value;

a distance between the ground layer the second extending portion is equal to a fifth value;

the first value is larger than the fourth value and the fifth value;

the second value is larger than the fourth value and the fifth value; and the third value is larger than the fourth value and the fifth value.

5. The antenna of claim 4, wherein the fifth value is larger than the fourth value.

6. The antenna of claim 2, wherein:

the first through the fourth coupling metals are disposed in a first symmetrical manner around a center of the ground layer and functions as a low-frequency coupler;

the fifth through the eighth coupling metals are disposed in a second symmetrical manner around the center of the ground layer and functions as a high-frequency coupler; and the first through the fourth radiating metals are disposed in a third symmetrical manner around the center of the ground layer and forms a resonant body.

7. The antenna of claim 2, wherein:

the first through the eighth coupling metals are not overlapped with each other when looking along a third direction which is perpendicular to the first direction and the second direction.

8. The antenna of claim 2, wherein:

the fifth through the eighth coupling metals are at least partially overlapped with the first extending portion and the second extending portion when looking along a third direction which is perpendicular to the first direction and the second direction.

9. The antenna of claim 2, wherein:

the first through the fourth radiating metals are at least partially overlapped with the fifth through the eighth coupling metals when looking along a third direction which is perpendicular to the first direction and the second direction.

10. The antenna of claim 2, wherein:

each of the first through the eight coupling metals include multiple metal sheets; and a thickness of each metal sheet is smaller than 8 μm.

11. The antenna of claim 1, further comprising:

a substrate having the ground layer and a dielectric body which contains the first polarization signal feeding terminal, the second polarization signal feeding terminal, the first polarization structure, the second polarization structure, the first through the fourth coupling metals, and the first through the fourth radiating metals, wherein a dielectric constant of the dielectric body is between 3 and 10.

12. The antenna of claim 1, further comprising:

a first feeding electrode disposed under the ground layer and electrically connected to the first polarization signal feeding terminal;

a second feeding electrode disposed under the ground layer and electrically connected to the second polarization signal feeding terminal; and at least one ground electrode disposed under the ground layer.

13. The antenna of claim 12, further comprising:

a first connection structure for electrically connecting the first extending portion to the first polarization signal feeding terminal; and a second connection structure for electrically connecting the second extending portion to the second polarization signal feeding terminal, wherein no other conducting component except the first connection structure and the second connection structure is disposed between the ground layer and the first through the fourth coupling metals.

14. The antenna of claim 1, further comprising an isolation structure which includes at least one isolation component disposed on a corner of the ground layer, wherein a distance between the ground layer and a top of the at least one isolation component is larger than a distance between the ground layer and each of the first through the fourth coupling metals or a distance between the ground layer and each of the first through the fourth radiating metals.

15. The antenna of claim 1, further comprising at least one ground structure disposed on the ground layer adjacent to the first extending portion or the second extending portion, wherein a distance between the ground layer and a top of the at least one ground structure is smaller than a distance between the ground layer and the first extending portion and a distance between the ground layer and the second extending portion.

16. The antenna of claim 15, further comprising a matching structure which includes at least one matching component disposed adjacent to a border of the ground layer, wherein a distance between the ground layer and a top of the at least one matching component is smaller than a distance between the ground layer and each of the first through the fourth coupling metals, a distance between the ground layer and each of the first through the fourth radiating metals and/or a distance between the ground layer and the top of the at least one ground structure.

17. The antenna of claim 16, wherein the at least one matching component is not disposed on any of the first through the fourth channels.

18. The antenna of claim 15, further comprising:

a first ground structure disposed adjacent to a first end of the first extending portion on the first channel under the first radiating metal and having an extending portion which extends in the first direction over the ground layer and is electrically connected to the ground layer;

a second ground structure disposed adjacent to a second end of the first extending portion on the second channel under the second radiating metal and having an extending portion which extends in the first direction over the ground layer and is electrically connected to the ground layer;

a third ground structure disposed adjacent to a first end of the second extending portion on the third channel under the third radiating metal and having an extending portion which extends in the second direction over the ground layer and is electrically connected to the ground layer; and a fourth ground structure disposed adjacent to a second end of the second extending portion on the fourth channel under the fourth radiating metal and extends in the second direction over the ground layer and is electrically connected to the ground layer.

19. The antenna of claim 1, wherein an angle between the first direction and the second direction is between 60 degrees and 120 degrees.

20. An antenna module, comprising:

one or multiple antennas of claim 1; and one or multiple flexible printed circuit (FPC) connectors each electrically connected to a feeding electrode and a ground electrode of a corresponding antenna among the one or multiple antennas of claim 1.

21. An electronic device, comprising:

a housing;

a first antenna module disposed on a first location of the housing facing a first radiation direction and configured to receive a first radio frequency (RF) signal in a first frequency band and a second RF signal in a second frequency band, wherein the first antenna module comprises:

one or multiple first antennas of claim 1; and one or multiple first FPC connectors each electrically connected to a feeding electrode and a ground electrode of a corresponding first antenna among the one or multiple first antennas;

a second antenna module disposed on a second location of the housing facing a second radiation direction and configured to receive a third RF signal in the first frequency band and a fourth RF signal in the second frequency band, wherein the second antenna module comprises:

one or multiple second antennas of claim 1; and one or multiple second FPC connectors each electrically connected to a feeding electrode and a ground electrode of a corresponding second antenna among the one or multiple second antennas; and an RF unit electrically connected to the first antenna module and the second antenna module and configured to:

control an operation of the first antenna module based on a strength of the first RF signal and a strength of the second RF signal; and control an operation of the second antenna module based on a strength of the third RF signal and a strength of the fourth RF signal.

22. The electronic device of claim 21, wherein the RF unit is further configured to:

control the first antenna module to operate in the first frequency band when determining that the strength of the first RF signal is larger than the strength of the second RF signal; and control the first antenna module to operate in the second frequency band when determining that the strength of the second RF signal is larger than the strength of the first RF signal.

23. The electronic device of claim 21, wherein the RF module is further configured to:

control the second antenna module to operate in the first frequency band when determining that the strength of the third RF signal is larger than the strength of the fourth RF signal; and control the second antenna module to operate in the second frequency band when determining that the strength of the fourth RF signal is larger than the strength of the third RF signal.

* * * * *